Figure 1:
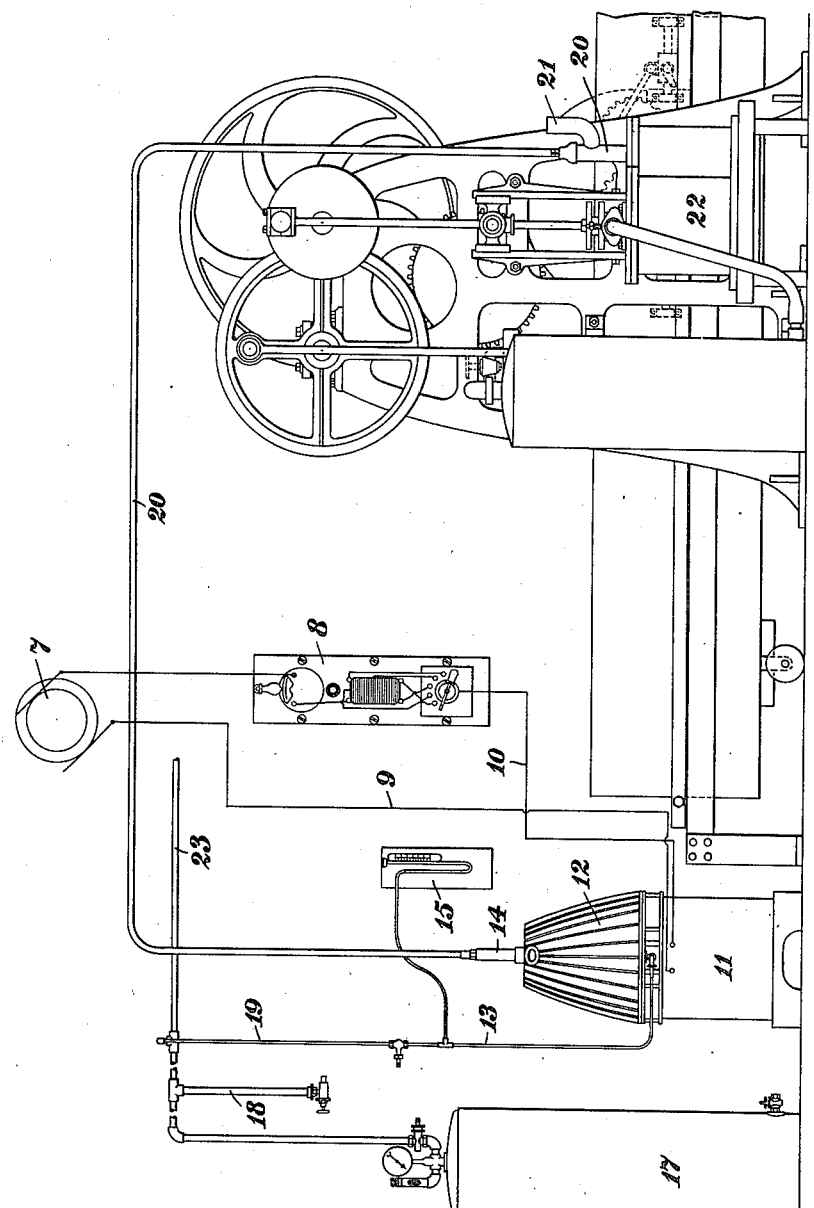

UNITED STATES PATENT OFFICE.

GEORGE LUNT, OF FORMBY, NEAR LIVERPOOL, ENGLAND.

TREATMENT OF DOUGH.

1,143,413. Specification of Letters Patent. Patented June 15, 1915.

Application filed March 13, 1913. Serial No. 754,014.

*To all whom it may concern:*

Be it known that I, GEORGE LUNT, a subject of the King of Great Britain, residing in Formby, near Liverpool, in the county of Lancaster, in the Kingdom of England, have invented certain new and useful Improvements in the Treatment of Dough, of which the following is a specification.

The invention set forth in British Patent No. 24127 of 1907 provides a method and apparatus for treating dough by causing abundant quantities of oxygen, air or any suitable gas containing free oxygen to thoroughly permeate the dough mass, so that the baked products thereof shall be whiter in color and of greater volume than those obtained from dough prepared by the method before known. That invention works perfectly, but I have found that if certain other gaseous media be substituted for a gas containing free oxygen, an even whiter and superior color and finish of the dough is obtained.

The present invention has for its object the treatment of dough by permeating the dough mass with the gaseous medium hereinafter mentioned, for the purpose of still further operation to give the dough a superior color and a decided increase in the size of the loaf.

To this end the gaseous medium which I prefer is peroxid of nitrogen, a very minute quantity of which is mixed with air, and caused to permeate the dough mass.

It has hitherto been proposed to treat flour with a gaseous medium of the kind referred to. Such proposals are confined exclusively to the treatment of flour, which was effected by agitating the flour continuously within a reel or chamber, and while under agitation subjecting the same to the action of the gaseous medium referred to. They were quite inapplicable to the treatment of a soft pasty mass, such as dough is.

According to the present invention therefore, I subject the dough to a thorough permeation by abundant quantities of the gaseous medium above referred to, namely air mixed with a very minute quantity of nitrogen peroxid. This permeation is preferably caused to take place at a period subsequent to the formation of the dough in the mixer, and preferably after the lapse of a part of the period of fermentation, and by the term dough, I mean the pasty mass which is produced after all the ingredients have been brought together. The nitrogen peroxid may be obtained by any of the well known methods of production, electric or otherwise, and minute quantities mixed with abundant quantities of air are introduced into the dough by means of nozzles which penetrate into, and become immersed in, and more or less sealed by the dough, before the gaseous medium is delivered through them, so that the expansion of the gas is effective in thoroughly stretching and permeating the dough. The admission of the gas to the nozzles or the like may be controlled either mechanically by the position they reach after penetration of the dough, or by the action of dough in sealing the nozzles, or by the contact of the dough with parts connected with the nozzles.

I now describe one form of apparatus which I have found suitable for putting my invention into practice, but it will be understood that I do not limit myself to the form of apparatus described since the essence of my invention consists in the treatment of dough by permeating it with a gaseous medium as above described.

A form of apparatus which I may employ is illustrated by way of example in the accompanying drawings in which there is represented in—

Figure 2:
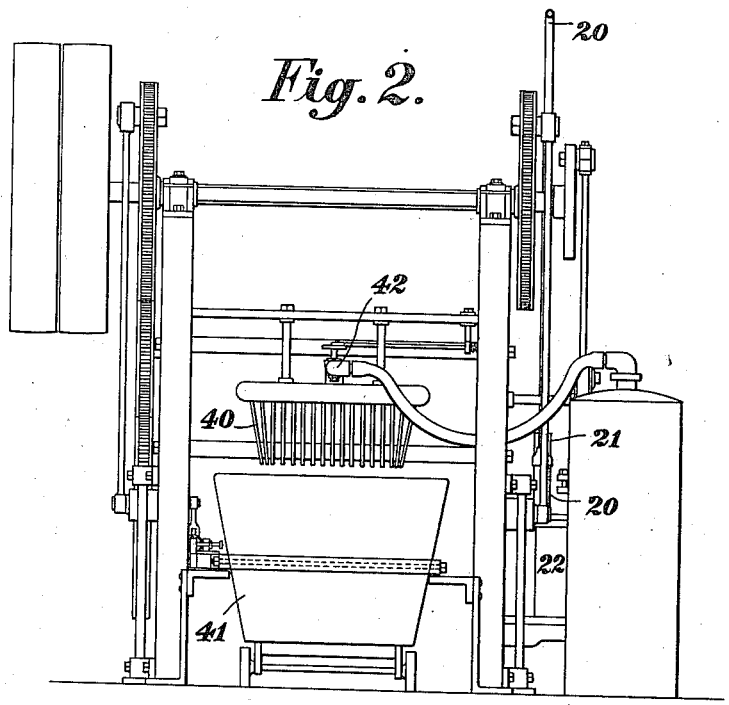
Figure 3:
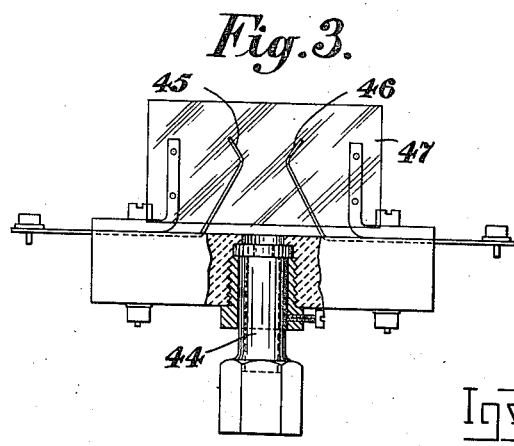

Figure 1 on the right-hand side, a known form of suitable apparatus in which according to the invention the chamber 22 leading to the pump is supplied by a pipe 20. Fig. 2 shows an end view of this portion of the apparatus. Fig. 3 shows a detail of the air inlet nozzle of the arc chamber described below.

The aforesaid pipe 20 in Fig. 1 is connected with the pipe 14 through which is admitted the air which has been treated, so as to contain nitrogen peroxid. The pipe 20 has also a branch pipe 21 for the admission of air when desired.

I will not describe in detail the operation of the part of my apparatus in which the gaseous medium is passed into the dough since this is known. I will only remark that the chamber 22 leads to a pump through which gaseous medium is forced into vertically reciprocating nozzles 40 through which the air is introduced into the dough. The dough is placed in a trough 41 which is longitudinally reciprocated in stages and a valve 42 is provided to allow admission of the gaseous fluid to the nozzles when these are immersed in the dough.

16 is a pump, 17 a reservoir, and 18 a drain pipe. The air from the pump passes down the pipe 19 which is connected with a pressure gage 15, through the pipe 13 into the arc chamber 12, which it leaves through the pipe 14 passing to the nozzles through the above mentioned pipe 20 and chamber 22. A pipe 25 is provided so that if desired the pump and reservoir may supply air to several arc chambers in parallel. Moreover if desired air may be supplied to the arc chamber 12 at several points through pipes similar to 19 and 13 provided with pressure gages similar to 15. In this case it is desirable to arrange for a separate arc at each point of admission. The air is admitted in such a manner as to flow upward through the arc in order to form nitrogen peroxid in known manner. The arc is produced by means of a transformer 11 which is connected by wires 9 and 10 with a switch board 8 connected to an alternator.

Fig. 3 shows a detail of a known method of admitting air into the arc chamber. 44 is a nozzle, 45 and 46 are electrodes between which the flaming arc passes and 47 is one of two mica plates placed slantingly on either side of the electrodes. In this way abundant quantities of air, filtered by passing through cotton wool or other filtering medium and containing minute quantities of nitrogen peroxid are caused to permeate the dough.

If it is desired to dilute the mixture by air which has not been treated, filtered air may be admitted through the branch pipe 21.

This apparatus may also be modified and simplified by omitting the pump on the part of the apparatus at the right hand side of the drawing, and consequently omitting the driving means therefor and supplying compressed air direct to the nozzles from an external source, such air having of course been treated so that it contains minute quantities of nitrogen peroxid. In place however, of the apparatus described above, any other suitable form of apparatus may be employed which is adapted to secure a thorough permeation and complete penetration of the dough by the gaseous medium. The permeation of the dough by the gaseous medium is by preference effected any time after the whole ingredients of the dough have been brought together, but I have found that it is preferable to treat the dough by the process, after a lapse of one quarter or a greater portion of the usual time of fermentation. If for example the period of time for mixing the dough and placing the latter in the oven be about four hours, the process is advantageously applied to the dough one hour or more after the latter has been mixed, and I find the best results are obtained by applying the process after about three hours from mixing.

I declare that what I claim is:—

1. The process for treating dough which comprises passing abundant quantities of air containing minute quantities of nitrogen peroxid through said dough so as to permeate it thoroughly.

2. The process for treating dough which comprises passing abundant quantities of air containing minute quantities of nitrogen peroxid through said dough so as to permeate it thoroughly after the expiration of part of the usual time of fermentation.

3. The process for treating dough which comprises passing abundant quantities of air containing minute quantities of nitrogen peroxid through said dough so as to permeate it thoroughly, after the expiration of ¾ of the usual time of fermentation.

In witness whereof, I have hereunto signed my name this 26th day of February 1913, in the presence of two subscribing witnesses.

GEORGE LUNT.

Witnesses:
G. C. DYMOND,
M. HAILES.